US012654383B2

(12) United States Patent
    Hung et al.

(10) Patent No.: US 12,654,383 B2
(45) Date of Patent: Jun. 16, 2026

(54) EMBOSSED FILM

(71) Applicant: Inteplast Group Corporation,
    Livingston, NJ (US)

(72) Inventors: Shen-Hsiu Hung, Sugarland, TX (US);
    Ter-Hai Lin, Sugarland, TX (US); **Ben
    Tseng, Somerset, NJ (US); Jyh-Yao
    Raphael Li,** Parsippany, NJ (US);
    Kelvin Yang, Madison, NJ (US)

(73) Assignee: **INTEPLAST GROUP
    CORPORATION,** Livingston, NJ (US)

( * ) Notice: Subject to any disclaimer, the term of this
    patent is extended or adjusted under 35
    U.S.C. 154(b) by 1255 days.

(21) Appl. No.: 17/105,038

(22) Filed: Nov. 25, 2020

(65) Prior Publication Data

US 2021/0154905 A1      May 27, 2021

Related U.S. Application Data

(60) Provisional application No. 62/940,318, filed on Nov.
    26, 2019.

(51) Int. Cl.
    *B32B 3/30*      (2006.01)
    *B29C 48/00*      (2019.01)
           (Continued)
(52) U.S. Cl.
    CPC ............ *B29C 48/18* (2019.02); *B29C 48/002*
       (2019.02); *B32B 3/30* (2013.01); *B32B 27/08*
       (2013.01); *B32B 27/20* (2013.01); *B32B 27/32*
             (2013.01); *C08K 3/26* (2013.01); ***B29K
             2023/0625* (2013.01); *B29K 2023/0633***
       (2013.01); *B29K 2995/0025* (2013.01); *B29K*

*2995/0097* (2013.01); *B32B 2250/242*
(2013.01); *B32B 2250/40* (2013.01); *B32B
2264/104* (2013.01); *B32B 2439/00* (2013.01);
*C08K 2003/265* (2013.01)

(58) Field of Classification Search
    CPC .......... B29C 48/002; B29K 2023/0625; B29K
           2023/0633; B29K 2995/0025; B29K
           2995/0097; B32B 27/20; B32B 27/32;
           B32B 3/30; C08K 2003/265; C08K 3/26;
                                C08L 23/04
    See application file for complete search history.

(56) References Cited

U.S. PATENT DOCUMENTS 3,036,945 A      5/1962   Souza
3,887,734 A      6/1975   Chazan
                   (Continued)

FOREIGN PATENT DOCUMENTS

WO      WO-2009042299 A1 *  4/2009   ............. B32B 27/08

*Primary Examiner* — Callie E Shosho
*Assistant Examiner* — Krupa Shukla
(74) *Attorney, Agent, or Firm* — Stinson LLP

(57)            ABSTRACT

The invention is also directed to a coextruded film comprising a core layer which comprises between 20 wt. % and 99 wt % znLLDPE or HDPE, wherein the core layer further comprises filler materials; and outer layers on each side of the core layer comprising between 50 and 99 wt % of one of LLDPE, LDPE, blends of LLDPE and LDPE, or mLLDPE; wherein the film contains relatively opaque embossed regions and relatively clear unembossed regions, wherein the opaque embossed regions comprise embossment-induced cavities and the filler materials.

11 Claims, 1 Drawing Sheet

B

A

B

(51) Int. Cl.

| | |
|---|---|
| *B29C 48/18* | (2019.01) |
| *B32B 27/08* | (2006.01) |
| *B32B 27/20* | (2006.01) |
| *B32B 27/32* | (2006.01) |
| *C08K 3/26* | (2006.01) |
| *B29K 23/00* | (2006.01) |

(56) References Cited

U.S. PATENT DOCUMENTS

| | | | | |
|---|---|---|---|---|
| 5,284,694 | A | 2/1994 | Lockridge et al. | |
| 7,951,873 | B2 | 5/2011 | Best et al. | |
| 2003/0203230 | A1 | 10/2003 | Pellingra et al. | |
| 2008/0057238 | A1* | 3/2008 | Follestad ................ | B32B 27/32 |
| | | | | 427/407.1 |
| 2011/0003099 | A1 | 1/2011 | Vinck | |
| 2011/0260371 | A1 | 10/2011 | Arora et al. | |
| 2016/0000615 | A1* | 1/2016 | Larios .................... | B32B 27/08 |
| | | | | 428/220 |

* cited by examiner

B

A

B

EMBOSSED FILM

REFERENCE TO RELATED APPLICATION

This application claims priority to U.S. provisional application 62/940,318 filed Nov. 26, 2019, the entire disclosure of which is expressly incorporated herein by reference.

FIELD OF THE INVENTION

The present invention generally relates to plastic films for use in applications such as food wrapping, can liner, food storage bags, zipper bags, and medical specimen bags.

BACKGROUND OF THE INVENTION

It is desirable to print messages and graphics on plastic films used for food wrapping, can liners, food storage bags, zipper bags, and medical specimen bags. For example, it may be desirable to print MIKE'S DELI or PLEASE RECYCLE or a recycle graphic on a film that is going to be used to wrap delicatessen meat. But ink is to be avoided because these films come into contact with food. Internal colorants are also to be avoided, because they can migrate to the outside surfaces of films and contact food.

SUMMARY OF THE INVENTION

Briefly, therefore, the invention is directed to a multilayer coextruded film comprising a znLLDPE-based core layer and outer layers on each side of the core layer comprising one of LLDPE, LDPE, blends of LLDPE and LDPE, or mLLDPE; wherein the film contains relatively opaque embossed regions and relatively clear unembossed regions.

The invention is also directed to a multilayer coextruded film comprising an HDPE-based core layer and outer layers on each side of the core layer comprising at least one of LLDPE, LDPE, blends of LLDPE and LDPE, or mLLDPE; wherein the film contains relatively opaque embossed regions and relatively clear unembossed regions.

The invention is also directed to a coextruded film comprising a core layer which comprises between 20 wt. % and 99 wt % znLLDPE or HDPE, wherein the core layer further comprises filler materials; and outer layers on each side of the core layer comprising between 50 and 99 wt % of one of LLDPE, LDPE, blends of LLDPE and LDPE, or mLLDPE; wherein the film contains relatively opaque embossed regions and relatively clear unembossed regions, wherein the opaque embossed regions comprise embossment-induced cavities and the filler materials.

Other objects and features will be in part apparent and in part pointed out below.

DETAILED DESCRIPTION OF PREFERRED EMBODIMENTS

Figures 1, 2:
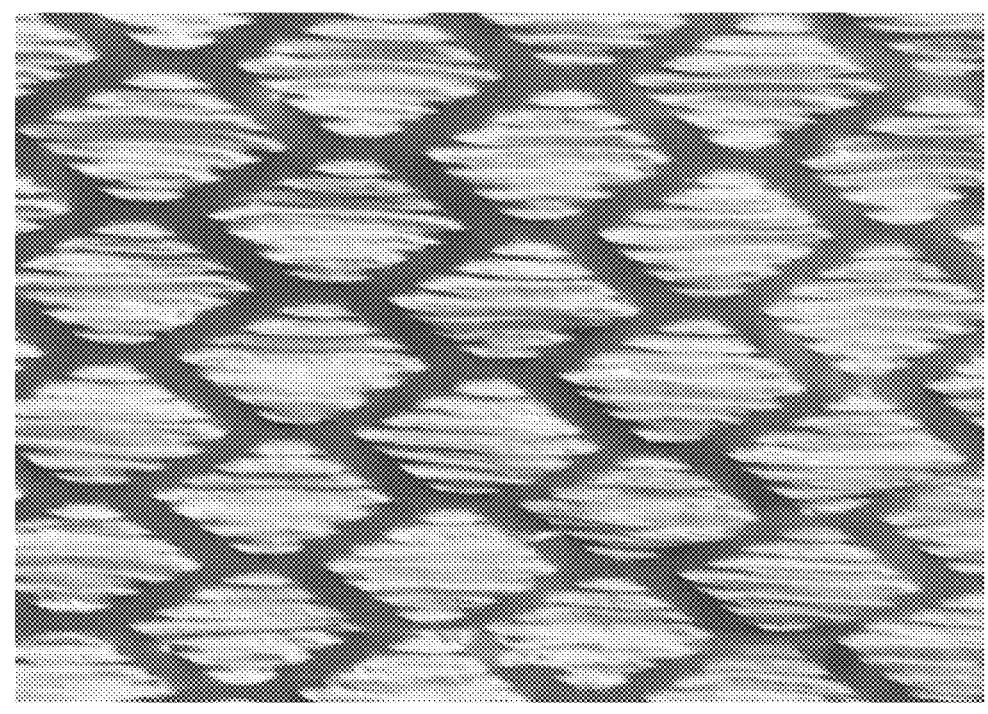
FIG. 1 is a schematic view of a film of the invention in cross section.
FIG. 2 is a front elevation of a film of the invention.

Films prepared according to this invention are multi-layer films which contain at least or exactly three layers: a core layer and two outer skin layers.

The core layer is based on PE, preferably high density polyethylene (HDPE), znLLDPE, or blends of HDPE and znLLDPE, and further comprises fillers. The core layer in one embodiment is "HDPE-based" in the sense that the core layer material is at least about 20 wt % HDPE, typically more than about 40 wt % HDPE. In a typical version of this embodiment, the core layer contains between about 20 and about 99% HDPE, such as between about 40 and about 95% HDPE. The core layer in another embodiment is "znLLDPE-based" in the sense that the core layer material is at least about 20 wt % znLLDPE, typically more than about 40 wt % znLLDPE. In a typical version of this embodiment, the core layer contains between about 20% and about 99% znLLDPE, such as between about 40 and about 95% znLL-DPE. In addition to the HDPE or znLLDPE, the core layer also contains fillers, such as $CaCO_3$, which induce opaqueness upon embossing, as described further below. Other opaqueness-inducing fillers include, inorganic particles for example, talc, mica, diatomaceous earth or the like; or organic particles, for example Nylon, PMMA (polymethyl methacrylate), etc. In a typical embodiment, the core layer contains between about 1 and about 80% fillers, such as between about 5 and about 60% fillers. Optional additives in the core layer include antistats, slip agents, stabilizers, antioxidants, colorants, and others. In some preferred embodiments, the core layer comprises between 70 and 90 wt % HDPE, znLLDPE, or blends of HDPE and znLLDPE, such as between 75 and 85 wt %. In these embodiments, the core layer further comprises between 10 and 30 wt % opaqueness-inducing filler material, such as 15 and 25 wt % of the opaqueness-inducing filler material. The core layer may also optionally comprise up to 5 wt % of the optional additives such as one or more of antistats, slip agents, stabilizers, antioxidants, and colorants. In some embodiments, the core layer consists of only the foregoing components in the foregoing proportions.

The outer skin layers are based on LLDPE, LDPE, blends of LLDPE and LDPE, or metallocene catalyzed ethylene copolymer (mLLDPE), comprising from 50 to 99 wt % of one or more of these components, such as between 50 and 95 wt % or 80 and 95 wt %. In addition to the PE component, the outer skin layers also contain fillers, such as $CaCO_3$, which induce opaqueness upon embossing, as described further below. Other opaqueness-inducing fillers include, inorganic particles for example, talc, mica, diatomaceous earth or the like; or organic particles, for example Nylon, PMMA (polymethyl methacrylate), etc. In a typical embodiment, the outer skin layers contain between about 1 and about 50 wt % opaqueness-inducing fillers, such as between about 5 and about 50 wt % or between 5 and 20 wt % opaqueness-inducing fillers. Optional additives include, for example, antistats, antiblocks, slip agents, stabilizers, antioxidants, colorants, processing aids, etc. The outer skin layers may also optionally comprise up to 5 wt % of the optional additives such as one or more of antistats, slip agents, stabilizers, antioxidants, and colorants. In some embodiments, the outer skin layers consist of only the foregoing components in the foregoing proportions.

The opaqueness inducing filler material in one embodiment has a particle size of between 0.1 and 100 μm, such as between 0.5 and 20 μm. One currently preferred material is $CaCO_3$ having a particle size between 0.1 and 10 μm, such as between 0.5 and 5 μm.

The overall thickness of the film is between about 5 and about 200 μm, such as between about 10 and about 100 μm. The core layer has a thickness between about 2.5 and about 180 μm, such as between about 5 and about 90 μm, such as between 5 and 20 μm. Each outer skin layer has a thickness between about 0.25 and about 40 μm, such as between about 0.5 and about 20 µm, such as between 5 and 10 µm. In preferred embodiments, the core layer and outer skin layers are the only layers in the film, and the outer skin layers are directly on the core layer. FIG. 1 is a schematic cross section showing the core layer A and outer skin layers B. In a preferred embodiment, the core layer is at least half the thickness of the outer layer, so the thickness ratio of the core layer to each outer layer is between about 1:2 and about 20:1, such as between about 1:1 and about 10:1.

In accordance with this invention, the film is embossed to impart text or a design. The unembossed film has good light transmissivity and is relatively clear, i.e., it has high clarity, low haze, and high gloss. The pressure action of the embossing whitens the embossed areas and turns them opaque due to action of the embossment force on the $CaCO_3$ or other filler particles trapped in the core layer and outer skin layers. The embossing force causes a localized stretching that induces cavities where the opaqueness-inducing filler pulls away from PE-based materials in the core and outer skin layers. These cavities induce opaqueness to the film in the embossed areas.

Example 1

A three-layer film was prepared in accordance with the invention, comprising a core layer which was 9.14 µm thick between two outer skin layers which were 6.86 µm thick.

The core layer comprised 80 wt % of a znLLDPE (Formolene L62009E2 available from Formosa Plastics). The core layer also comprised 20 wt % $CaCO_3$.

Each outer skin layer comprised 90 wt % of LLDPE (Dowlex™ 2645.11G from Dow Chemical Company). Each skin layer also comprised 10 wt % $CaCO_3$. The $CaCO_3$ in both the core and skin layers obtained from Heritage Plastics under the product designation HM10 Max and had a nominal particle size of 1 µm.

The film was embossed with diamond shapes and is shown in FIG. 2. There are opaque diamonds which are where the film was subjected to embossing pressure. And there are lines between the embossed diamonds. The film in these lines has good light transmissivity and is relatively clear, i.e., it has high clarity, low haze, and high gloss.

Example 2

A three-layer film of the invention comprises a 9.14 µm thick core layer comprising 80 wt % of an HDPE (Formolene E924 available from Formosa Plastics) having a melting point of 131° C./268° F. and a density 0.949 g/cc. The core layer also comprises 20 wt % $CaCO_3$ having a nominal particle size of 1 µm.

Each outer skin layer is 6.86 µm thick and comprises 90 wt % of mLLDPE (Marlex D143 from Chevron Phillips Chemical Company). Each skin layer also comprises 10 wt % $CaCO_3$ having a nominal particle size of 1 µm.

Example 3

A three-layer film of the invention comprises a 9.14 µm thick core layer comprised 80 wt % of an LLDPE (Formolene FORMAX L9/L91507E2 available from Formosa Plastics). The core layer also comprises 20 wt % $CaCO_3$ having a nominal particle size of 1 µm.

Each outer skin layer is 6.86 µm thick and comprises 90 wt % of LLDPE (1018HA from Exxon Mobil Chemical Company). Each skin layer also comprises 10 wt % $CaCO_3$ having a nominal particle size of 1 µm.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A co-extruded film comprising:
   a core layer which comprises between 20 wt. % and 99 wt % znLLDPE, wherein the core layer further comprises filler materials; and
   outer layers on each side of the core layer comprising between 50 and 99 wt % PE material selected from among LLDPE, LDPE, blends of LLDPE and LDPE, or mLLDPE;
   wherein the co-extruded film contains opaque embossed regions and clear unembossed regions, wherein the opaque embossed regions comprise embossment-induced cavities and the filler materials.

2. The co-extruded film of claim 1 wherein the outer layers comprise filler materials.

3. The co-extruded film of claim 1 wherein the core layer has a thickness between 5 and 20 µm and the outer layers each have a thickness between 5 and 10 µm.

4. The co-extruded film of claim 1 wherein the core layer comprises between 70 and 90 wt % znLLDPE.

5. The co-extruded film of claim 4 wherein the core layer comprises between 10 and 30 wt % of the filler materials and the filler materials are inorganic particles.

6. The co-extruded film of claim 4 wherein the core layer comprises between 10 and 30 wt % of the filler materials and the filler materials are organic particles.

7. The co-extruded film of claim 4 wherein the core layer comprises between 10 and 30 wt % of the filler materials and the filler materials are $CaCO_3$ particles.

8. The co-extruded film of claim 1 wherein:
   the core layer comprises between 40 and 90 wt % znLLDPE, between 10 and 60 wt % filler materials, and up to 5 wt % other additives;
   the outer layers comprise 50 to 95 wt % PE material selected from among LLDPE, LDPE, blends of LLDPE and LDPE, and mLLDPE, between 5 and 50 wt % filler materials, and up to 5 wt % other additives.

9. The co-extruded film of claim 1 wherein:
   the core layer comprises between 70 and 90 wt % znLLDPE, between 10 and 30 wt % filler materials, and up to 5 wt % other additives;
   the outer layers comprise 80 to 95 wt % PE material selected from among LLDPE, LDPE, blends of LLDPE and LDPE, and mLLDPE, between 5 and 20 wt % filler materials, and up to 5 wt % other additives.

10. The co-extruded film of claim 1 consisting of three layers wherein:
   the core layer consists of between 70 and 90 wt % znLLDPE, between 10 and 30 wt % filler materials, and up to 5 wt % other additives;
   the outer layers consist of 80 to 95 wt % PE material selected from among LLDPE, LDPE, blends of LLDPE and LDPE, and mLLDPE, between 5 and 20 wt % filler materials, and up to 5 wt % other additives.

11. The co-extruded film of claim 1 consisting of three layers wherein:

the core layer consists of between 70 and 90 wt % znLLDPE, between 10 and 30 wt % $CaCO_3$, and up to 5 wt % other additives;

the outer layers consist of 80 to 95 wt % PE material selected from among LLDPE, LDPE, blends of LLDPE and LDPE, and mLLDPE, between 5 and 20 wt % $CaCO_3$, and up to 5 wt % other additives.

* * * * *